MODULAR ELECTRICAL UNITS AND ASSEMBLIES THEREOF

Filed May 13, 1958

3 Sheets-Sheet 1

INVENTOR.
JACK S. KILBY
BY John W. Michael
ATTORNEY

MODULAR ELECTRICAL UNITS AND ASSEMBLIES THEREOF

Filed May 13, 1958

INVENTOR.

JACK S. KILBY

BY John W. Michael

ATTORNEY

May 19, 1964 J. S. KILBY 3,134,049

MODULAR ELECTRICAL UNITS AND ASSEMBLIES THEREOF

Filed May 13, 1958 3 Sheets-Sheet 3

INVENTOR.
JACK S. KILBY
BY John W. Michael
ATTORNEY

United States Patent Office 3,134,049

Patented May 19, 1964

3,134,049

MODULAR ELECTRICAL UNITS AND ASSEMBLIES THEREOF

Jack S. Kilby, Milwaukee, Wis., assignor to Globe-Union Inc., Milwaukee, Wis., a corporation of Delaware Filed May 13, 1958, Ser. No. 734,865
2 Claims. (Cl. 317—101)

This invention relates to improvements in modular electrical units and assemblies of such units. More particularly this invention relates to modular units and assemblies thereof which include a semi-conductor device such as a transistor and other circuit elements such as capacitors and resistors.

It is the object of this invention to provide a modular unit of this type which is inexpensive to manufacture and occupies a minimum amount of space.

Another object is to provide a unit having a basic arrangement and connection of its circuit elements which can be varied slightly to provide a wide variety of different circuits.

Another object is to provide a unit which is specially adapted for assembly with other units to provide a variety of circuits and which can be readily tested prior to assembly with other units.

These objects are attained by a modular unit which includes a ceramic base having a cavity in one end thereof in which a semi-conductor device such as a transistor is mounted. The transistor leads are brought out through openings in the closed end of the base for connection to other circuit elements mounted on the side and cavity end of the base. Such other circuit elements can include one or more capacitors mounted on the cavity end of the base and one or more resistors mounted on the side of the base. Electrical connection between the transistor, capacitor and resistors to produce a single-stage amplifier circuit, for example, is made by means of conductive areas adhered to the sides and closed end of the base and ribbon-type leads connected to the conductive areas on the side of the base.

Several units can be assembled end-to-end in a stacked relationship to provide more complex circuits by simply extending the ribbon-type leads and properly connecting them to the conductive areas on the sides of the assembled units.

Other objects and advantages will be pointed out in, or be apparent from the specification and claims, as will obvious modifications of the three embodiments shown in the drawings, in which:

Figure 4:
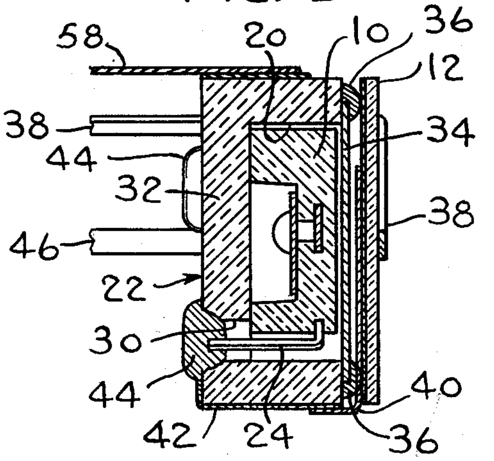
FIG. 4 is a sectional view taken along line 4—4 of FIG. 3.
Figures 5, 6:
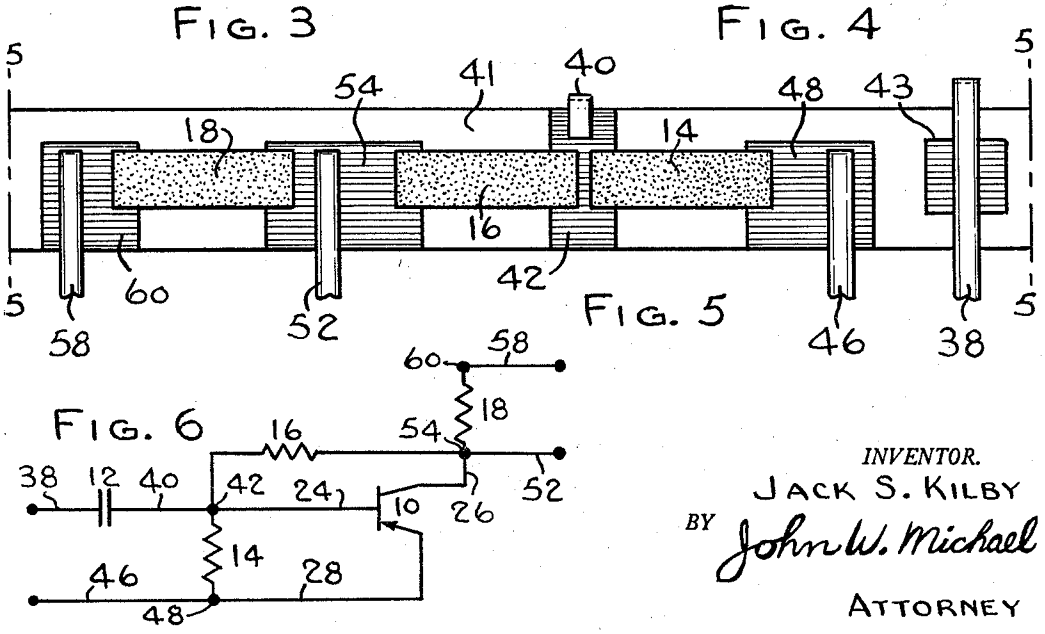
FIG. 5 is a layout view in side elevation cut on line 5—5 of FIG. 1 and showing the entire circumference of the unit.
FIG. 6 is an electrical wiring diagram of the single unit.

Referring now to the drawings, FIGS. 1–6 show one embodiment of a modular electrical unit including a transistor 10, a capacitor 12 and resistors 14, 16 and 18 arranged and connected to form a single-stage transistor amplifier (FIG. 6). Transistor 10 of conventional design is mounted in a cavity 20 in a cylindrical base 22 of ceramic material about the size of the eraser on an ordinary lead pencil. The transistor is connected into the circuit by suitable leads 24, 26 and 28 extending through openings 30 in closed end wall 32 of base 22 (FIG. 4) and is sealed in cavity 20 by a metal disc 34 fastened to the base by solder 36.

A disc-shaped capacitor 12 having a terminal lead 38 and a lead 40 electrically connected to opposite sides thereof is mounted at one end of base 22 overlying disc 34 by means of a suitable adhesive (not shown). Leads 38 and 40 and the other leads shown in the drawings and described hereinafter are preferably of ribbon-shape and made of silver.

Resistors 14, 16 and 18 are adhered to the side 41 of base 22 as shown in FIG. 5 and electrically connected into the circuit by means of suitable conductive areas on the sides and one end of base 22 (FIGS. 1 and 5) as described in detail hereinafter. The resistors may be applied to the side of the base in the form of paint containing carbon which is screened onto the surfaces of base 22. The conductive areas may be applied by the stencil-screen process by which conductive material containing silver is applied to the ceramic base and then fired to bond such material to the base.

Figure 1:
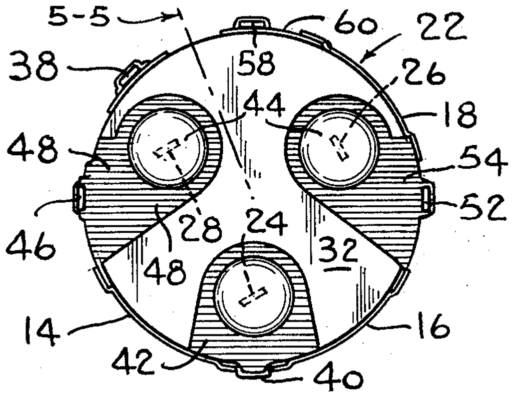
FIG. 1 is a plan view of one end of a single modular unit embodying the present invention.
Figure 2:
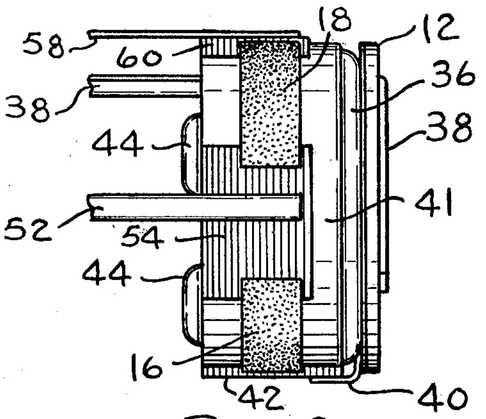
FIG. 2 is a view in side elevation of the unit shown in FIG. 1.
Figure 3:
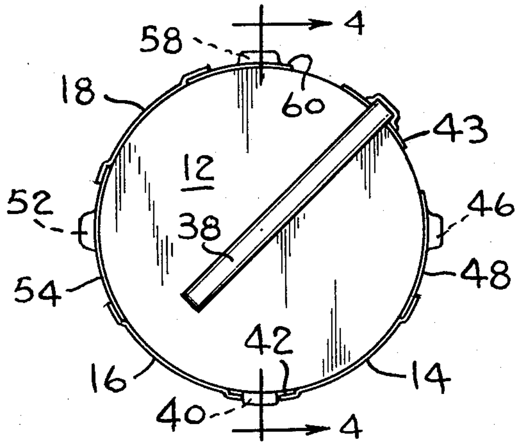
FIG. 3 is a plan view of the other end of the unit shown in FIG. 1.

The electrical connections between the various components of the unit can best be described by tracing the circuit shown in FIG. 6 with reference to the physical location and mounting of the components shown in FIGS. 1–5. Starting with capacitor 12 having leads 38 and 40, terminal lead 38 is bent over the top side of capacitor 12 for connection thereto and is anchored to the side of the base by means of silvered area 43. Lead 40 (connected to the underside of capacitor 12 as shown in FIG. 4) is connected to resistors 14 and 16 and transistor lead 24 by means of a continuous silvered area 42 on the side 41 (FIG. 5) and end wall 32 (FIG. 1) of base 22. Contact between the portion of silvered area 42 on side 41 and resistors 14 and 16 is made by applying the resistors to such side so that one end portion of each resistor overlaps the silvered area as shown in FIG. 5. Contact is made between lead 24 of transistor 10 and the portion of silvered area on wall 32 by a soldered connection 44, as shown in FIGS. 1 and 4.

The right hand end of resistor 14 (as viewed in FIG. 5) is connected to a terminal lead 46 and transistor lead 28 by means of a continuous silvered area 48 on side 41 (FIG. 5) and end wall 32 (FIG. 1) of base 22. Terminal lead 46 is soldered to the portion of silvered area 48 on side 41 and resistor 14 makes contact with such portion by virtue of the overlapping relationship shown in FIG. 5. Transistor lead 28 is connected to the portion of silvered area 48 on end wall 32 by a soldered connection 44.

The left hand end of resistor 16 (as viewed in FIG. 5) is connected to resistor 18, transistor lead 26 and terminal lead 52 by means of a continuous silvered area 54 on side 41 (FIG. 5) and end wall 32 (FIG. 1) of base 22. Terminal lead 52 is soldered to the portion of silvered area 54 on side 41 and resistor 18 makes contact with such portion by virtue of the overlapping relationship shown in FIG. 5. Transistor lead 26 is connected to the portion of silvered area 54 on end wall 32 by a soldered connection 44.

The left hand end of resistor 18 (as viewed in FIG. 5) is connected to terminal lead 58 by means of a silvered area 60 on side 41 of base 22 (FIG. 5). Terminal lead 58 is soldered to silvered area 60 and resistor 18 makes contact with such area by virtue of the overlapping relationship shown in FIG. 5.

The single-stage transistor amplifier unit described above is just one of many circuits that can be made. By varying the connections and the number and type of components used, other circuits such as oscillators, etc. can be made using the same basic arrangement of components while retaining the advantages of small size, low unit cost and compactness.

The units have been specially designed to permit assembly of a plurality of separate units to produce more complete and complex circuits. Two such assemblies are shown in the drawings and described hereinafter.

Figures 7, 8, 9, 11:
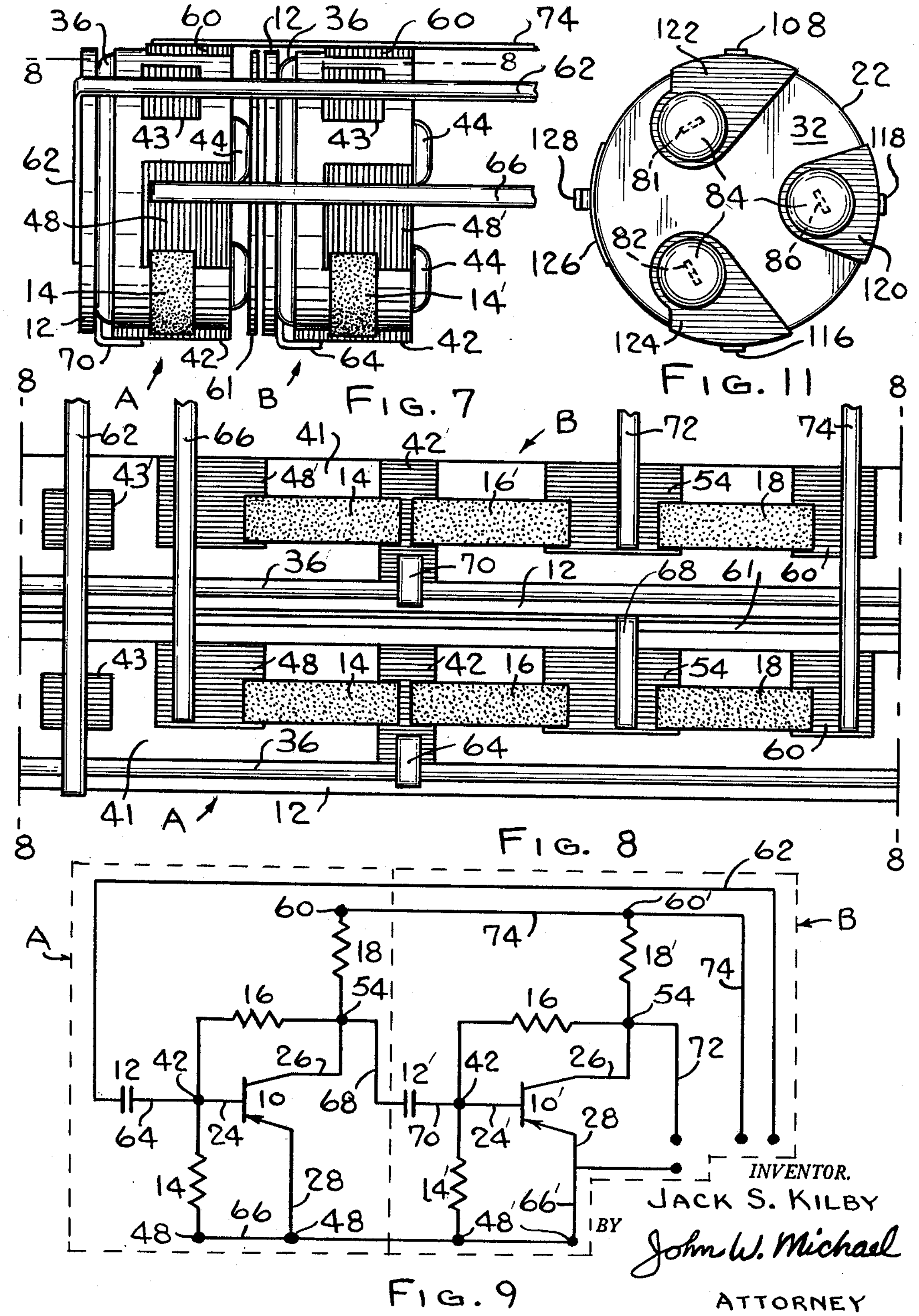
FIG. 7 is a view in side elevation of a pair of modular units in stacked relationship.
FIG. 8 is a layout view in side elevation cut on line 8—8 of FIG. 7 showing the entire circumference of the stacked units shown in FIG. 7.
FIG. 9 is an electrical wiring diagram of the stacked units shown in FIGS. 7 and 8.
FIG. 11 is a plan view of the other end of the units shown in FIG. 10.

FIGS. 7, 8 and 9 show a stacked arrangement of the single-stage transistor amplifier unit (FIGS. 1–6) and previously described to produce a two-stage transistor amplifier having a circuit diagram like that shown in FIG. 9. Like reference numerals have been used on like parts in all instances.

Units A and B are positioned end-to-end with the capacitor 12 of unit B lying adjacent the bottom of unit A (FIG. 7) with a disc-shaped insulator 61 positioned between the units. Electrical connection between units is accomplished by suitable leads soldered to the silvered areas on the sides 41 of such units to produce the two-stage amplifier circuit shown in FIG. 9.

Connection to the top side of capacitor 12 of unit A is made by a lead 62 which lies adjacent the sides 41 of the units and is bent over the top surface of the capacitor for connection thereto. By comparing FIGS. 8 and 5 it is seen that lead 62 (FIG. 8) is the counterpart of lead 38 (FIG. 5) except that lead 62 has been lengthened sufficiently to extend past unit B as shown in FIG. 7.

The counterpart of leads 64 and 70 (FIG. 8) which serve to connect the underside of capacitors 12 to silvered areas 42 is lead 40 (FIG. 5) which performs the same function. Similarly, the counterpart of terminal lead 72 (FIG. 8) is lead 52 (FIG. 5) and the counterparts of terminal leads 66 and 74 (FIG. 8) are terminal leads 46 and 58, respectively (FIG. 5). Lead 68 (FIG. 8) serves to connect silvered area 54 of unit A to the top surface of capacitor 12 of unit B and has no counterpart in the single-stage unit (FIG. 5).

From the foregoing it is apparent that a plurality of single-stage amplifier units can be readily assembled to form multiple-stage amplifiers by simply extending and properly connecting the various leads fastened to the silvered areas on the sides of the respective units in the manner shown in FIGS. 7–9.

Figures 10, 12, 13, 14, 15:
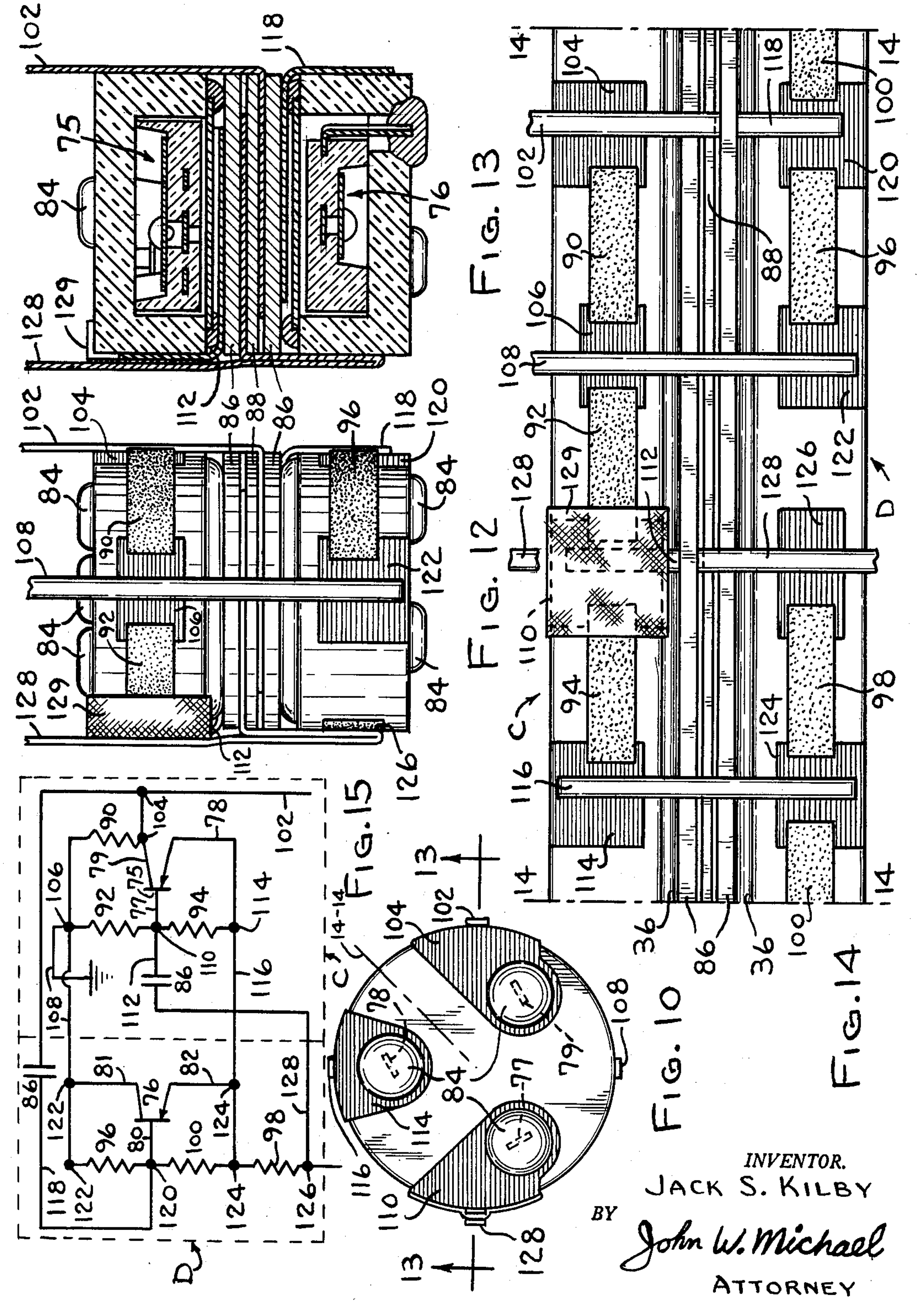
FIG. 10 is a plan view of one end of a pair of modular units in a second stacked relationship.
FIG. 12 is a view in side elevation of the stacked units shown in FIGS. 10 and 11.
FIG. 13 is a sectional view taken along line 13—13 of FIG. 10.
FIG. 14 is a layout view in side elevation cut along line 14—14 of FIG. 10 showing the entire circumference of the stacked units shown in FIGS. 10–13.
FIG. 15 is an electrical wiring diagram of the stacked units shown in FIGS. 10–14.

A second stacked arrangement of units is shown in FIGS. 10–15 wherein a pair of units C and D are arranged and connected to provide a two-stage audio frequency oscillator having a circuit diagram like that shown in FIG. 15.

Unit C includes a transistor 75 having leads 77, 78 and 79 (FIG. 10) mounted and sealed in a cavity in the cylindrical base as previously described with respect to the single amplifier unit shown on FIGS. 1–6. Unit D includes a transistor 76 having leads 80, 81 and 82 (FIG. 11) mounted and sealed in an identical manner. The transistor leads are brought out through suitable openings in the end walls of the base and are electrically connected to the silvered areas on such end walls by soldered connections 84 as shown in FIGS. 10, 11 and 13. Both units have a capacitor 86 mounted on the ends thereof and resistors applied to the sides in the manner previously described. The units are arranged end-to-end with capacitors 86 lying adjacent each other separated only by an insulator disc 88. As seen by comparing FIGS. 10 and 11, the units have been rotated 90 degrees with respect to each other prior to assembly.

The electrical connections between the various components of the two units can best be described by tracing the circuit shown in FIG. 14 with reference to the physical location and mounting of the components shown in FIGS. 10–13.

Starting with terminal lead 102, it is seen (FIGS. 14 and 15) that this lead connects with transistor lead 79 and resistor 90 of unit C by means of silvered area 104 and terminates at a connection with one side of capacitor 86 of unit D. A lead 118 connects the other side of the unit D capacitor with resistors 96 and 100 and transistor lead 80 of unit D by means of silvered area 120. Terminal lead 108 to ground connects to resistors 90 and 92 of unit C by means of silvered area 106 and continues on to unit D for connection to resistor 96 and transistor lead 81 by means of silvered area 122.

One end of terminal lead 128 is connected to one side of capacitor 86 of unit C and is then bent downwardly (FIGS. 12 and 13) for connection to resistor 98 of unit D by means of silvered area 126 and then bent back up again along side of unit C to form one terminal for the assembled unit. The upper part of lead 128 adjacent the side of unit C is insulated therefrom by a piece of adhesive tape 129, as shown, or any other suitable means. A lead 112 connects the other side of the unit C capacitor to resistors 92 and 94 and transistor lead 77 of unit C by means of silvered area 110 (shown in dotted lines under adhesive tape 129 in FIG. 14).

Resistor 94 and transistor lead 78 of unit C are interconnected by means of silvered area 114. Silvered area 114 in turn is connected to resistors 98 and 100 and transistor lead 82 of unit D by means of lead 116 and silvered area 124.

Both the single unit and the stacked assemblies may be either protectively coated or mounted in a metal can and potted.

Although three embodiments of the present invention have been illustrated and described, it will be apparent to those skilled in the art that various changes and modifications may be made therein without departing from the spirit of the invention or from the scope of the appended claims.

I claim:

1. An assembly of modular electrical units comprising:
a plurality of cylindrical insulating bases each having two ends and a side, a cavity formed in one of said two ends of each base, the other end of each base having a plurality of small openings therein leading to said cavity;
a semi-conductor mounted in the cavity of each base;
a plurality of leads connected to said semi-conductors and extending from said cavities through said openings in said other end of each base;
a capacitor mounted on said one end of each of said bases;
a plurality of resistors mounted on said side of each of said bases;
said bases positioned on a common axis with the end of one base adjacent the end of the next; and
means including conductive areas adhered to the sides and to said other end of each of said bases and including leads connected to said conductive areas on said sides to electrically connect said semi-conductors, capacitors and resistors of said units to produce a useful electrical circuit.

2. An assembly according to claim 1 in which some of said leads connected to said conductive areas adhered to the side of each base lie substantially perpendicular with the ends of said bases and extend beyond the end of said stacked assembly of units to provide terminals for the unit.

References Cited in the file of this patent

UNITED STATES PATENTS 2,611,040 Brunetti ---------------- Sept. 16, 1952
2,781,480 Mueller ---------------- Feb. 12, 1957

2,786,696 Blitz -------------------- Mar. 26, 1957
2,788,475 Ingraham ---------------- Apr. 9, 1957
2,817,048 Thuermel et al. ---------- Dec. 17, 1957
2,821,669 Christian ---------------- Jan. 28, 1958
2,899,608 Wellard ---------------- Aug. 11, 1959

OTHER REFERENCES

Article, "Modular Electronic Subassemblies," Electrical Mfg., vol. 52, Issue 5, No. 1953, pp. 156–159.